United States Patent [19]

Blum et al.

[11] Patent Number: 5,489,644
[45] Date of Patent: Feb. 6, 1996

[54] SOLUTIONS OF POLYIMIDE-FORMING COATING MATERIALS

[75] Inventors: Rainer Blum, Ludwigshafen; Gerhard Hoffmann, Otterstadt, both of Germany

[73] Assignee: BASF Lacke + Farben, Muenster, Germany

[21] Appl. No.: 220,496

[22] Filed: Mar. 31, 1994

[30] Foreign Application Priority Data

Apr. 23, 1993 [DE] Germany .............. 43 13 246.4

[51] Int. Cl.⁶ .................. C08G 73/10; C08G 69/26
[52] U.S. Cl. .................. 524/600; 524/606; 524/607; 525/419; 525/420; 428/411.1; 428/473.5; 528/125; 528/128; 528/172; 528/173; 528/176; 528/185; 528/220; 528/229; 528/350; 528/353
[58] Field of Search .................. 528/353, 125, 528/128, 172, 173, 176, 185, 188, 220, 229, 350; 524/600, 606, 607; 525/419, 420; 428/411.1, 473.5

[56] References Cited

U.S. PATENT DOCUMENTS

| | | |
|---|---|---|
| 3,347,808 | 10/1967 | Lavin et al. . |
| 3,700,649 | 10/1972 | Boram et al. . |
| 4,874,835 | 10/1989 | Berdahl . |
| 4,960,824 | 10/1990 | Olson et al. . |
| 5,004,627 | 4/1991 | Presswood et al. .......... 427/133 |
| 5,264,545 | 11/1993 | Blum et al. .................. 528/353 |
| 5,332,799 | 7/1994 | Blum et al. .................. 528/353 |

FOREIGN PATENT DOCUMENTS 048080  3/1982  European Pat. Off. .

OTHER PUBLICATIONS

*Patent Abst. of Japan*, vol. 13, No. 339 (C–624) (3687), Jul. 31, 1989 (English abstract of JP–A 01 117 878).

*Primary Examiner*—P. Hampton-Hightower
*Attorney, Agent, or Firm*—Keil & Weinkauf

[57] ABSTRACT

Solutions of polyimide-forming substances contain

A) aromatic or partly aromatic diamines and

B) tetraesters of imide-forming aromatic or partly aromatic tetracarboxylic acids or mixtures of these tetraesters with the corresponding tri-, di- and/or monoesters.

These solutions are suitable for the production of coatings.

4 Claims, No Drawings

SOLUTIONS OF POLYIMIDE-FORMING COATING MATERIALS

BACKGROUND OF THE INVENTION

1. Field of the Invention

The present invention relates to solutions of polyimide-forming substances, containing A) aromatic or partly aromatic diamines and B) tetraesters of imide-forming aromatic or partly aromatic tetracarboxylic acids or mixtures of these tetraesters with the corresponding tri-, di- and/or monoesters.

The present invention furthermore relates to the use of such solutions for the production of coatings.

Polyimides are being increasingly used for coating metal wires, glass and quartz fibers and silicon substrates (silicon wafers). They are used in particular in electronics and microelectronics, for example as intermediate or top layers in the production of circuits.

The substrates are generally coated with solutions of polyimides or polyamic acids, conversion to the imide taking place on the substrate surface in the case of the polyamic acid.

The solutions of polyimides and polyamic acids must, however, be of a relatively low concentration in order to give a viscosity sufficiently low for processing. Typical commercial products generally have a solids content of only from 12 to 20% by weight.

The low concentration results in high shrinkage during drying. This shrinkage leads to a greater or lesser impression of the structure under the polyimide layer in the polyimide surface.

Inaccuracies in the structure occur especially in the case of, for example, multilayer coatings required for circuits.

For this reason and to avoid excessive amounts of solvents, more highly concentrated solutions are desirable. Higher concentrations are possible in principle with solutions which contain only the starting materials for the polyimides. However, since solutions of tetracarboxylic dianhydrides and diamines do not have a long shelf life but polymerize to give polyamic acid, diesters of tetracarboxylic acids have been used to date instead of the tetracarboxylic dianhydrides.

2. Description of the Related Art

U.S. Pat. No. 3,700,649 describes solutions of diesters of benzophenonetetracarboxylic acid and diamines having a very low basicity for the production of polyimide coatings. Alkanols and benzyl alcohol are mentioned as alcohols for the esterification.

In the case of the solutions of diesters of tetracarboxylic acids and diamines, disclosed in U.S. Pat. No. 3,347,808, alkanols are used as the esterification component.

U.S. Pat. No. 4,874,835 relates to solutions of diamines and diesters for oxydiphthalic acid with alkanols.

U.S. Pat. No. 4,960,824 discloses solutions of diesters of araliphatic tetracarboxylic acids with alkanols and at least one diamine selected from the group consisting of m-phenylenediamine, p-phenylenediamine and 4-aminophenyl ether.

German Patent Applications P 41 35 056.1 and P 41 35 058.8 describe solutions of polyimide-forming starting materials, such as diamines and diesters of tetracarboxylic acids, and their use for coatings.

According to the prior art, the use of esters other than the diesters is not regarded as helpful. However, a disadvantage of the use of pure diesters is an increase in the viscosity on prolonged storage, presumably due to the formation of polymeric salts. Another disadvantage is the formation of bubbles during the production of layers thicker than about 30 μm. However, such thick layers are essential for buffer layers in chip production.

SUMMARY OF THE INVENTION

It is an object of the present invention to provide improved solutions of polyimide-forming substances.

We have found that this object is achieved by the solutions defined at the outset and their use for the production of polyimide coatings.

The novel solutions contain, as starting materials for the polyimides, aromatic or partly aromatic diamines and esters of aromatic or partly aromatic tetracarboxylic acids.

DESCRIPTION OF PREFERRED EMBODIMENTS

Suitable diamines are aromatic or partly aromatic diamines which contain at least one aromatic ring, in particular those in which the amino groups are bonded to an aromatic nucleus. These may be diamines having an aromatic ring, fused aromatic ring systems or aromatic rings which are bonded, for example, by a single bond, an ether, carbonyl or sulfonyl group or aliphatic hydrocarbon radicals, in particular of 1 to 8 carbon atoms, and, if required, also heteroatoms, such as sulfur, nitrogen or oxygen. The aromatic rings or ring systems may be substituted by, in particular, $C_1$–$C_6$-alkyl or $C_1$–$C_6$-alkoxy groups or halogen atoms, such as chlorine and fluorine.

Examples of suitable substances are benzidine, dimethylbenzidine, dimethoxybenzidine, diethoxybenzidine, diaminodiphenyl sulfone, diaminodiphenylpropane, diaminodiphenyl sulfide, 4,4'-bis[2-(4-aminophenyl)propane]phenylene/bisaniline P, 4,4'-dimethyl-3,3'-diaminodiphenyl sulfone, 4,4'-dimethyl-3,3'-diaminodiphenyl sulfide, p-phenylenediamine, m-phenylenediamine, diethyltoluylenediamine, diaminomethoxybenzene, xylylenediamine, diaminocumene, diaminonaphthalene, diaminonaphthol, diaminonaphthoquinone, diaminoanthracene, diaminoanthraquinone, diaminophenanthrene, 9,10-bis(4-aminophenyl)anthracene, 3,5-diethyl-2,4-diaminotoluene, 3,5-diethyl-2,6-diaminotoluene, diisopropylphenylenediamine, 4,4'-methylenebis-(2,6-diisopropylaniline), 4,4'-methylenebis(2-methyl-6-isopropylaniline), 2,6-diisopropylaniline, 1,3-diamino-4-methoxybenzene, hexafluoro-2,2-bis(3-amino-4,5-dimethylphenyl)propane, 2,2-bis(4,4'-aminophenyl)propane, bis(4,4'-aminophenyl) sulfone, bis(4,4'-aminophenyl) sulfide, bis(3,3'-aminophenyl) sulfone, bis(3,3'-aminophenyl) sulfide, 2,2-bis[4-(4-aminophenoxy)phenyl]propane, 2,2-bis-[4-(4-aminophenoxy)phenyl] hexafluoropropane, bis[4-(aminophenoxy)phenyl]sulfone, bis[4-(4-aminophenoxy)phenyl] sulfide, 2,2-bis[4-(3-aminophenoxy)phenyl] hexafluoropropane, bis[4-(3-aminophenoxy)phenyl] sulfone, bis[4-(3-aminophenoxy)phenyl] sulfide, 4,4'-bis(4-aminophenoxy)biphenyl, 4,4'-bis(3-aminophenoxy)biphenyl, 1,4'-bis(4-aminophenoxy)phenylene, 1,3'-bis(4-aminophenoxy)phenylene, diaminodiphenylmethane, diaminodiphenoxyphenyl sulfone, diaminodiphenoxyphenyl sulfide, diaminodiphenyl oxide, diaminopyridine, bis(4-aminophenyl)dialkylsilanes, 3,3'-dihydroxy-4,4'-diaminobiphenyl, 9,9'-bis(4-amino)fluorene, o-toluidine sulfone, diaminobenzanilide, acridinediamine and methylenebisanthranilamide.

Mixtures of diamines are also particularly suitable.

Particularly preferred diamines are diaminodiphenylmethane, diaminodiphenyl sulfone, 4,4'-diaminodiphenyl oxide, 2,2-bis[4-(4-aminophenoxy)phenyl]propane and 2,2-bis[4-(4-aminophenoxy)phenyl]hexafluoropropane Components B are tetraesters of imide-forming aromatic or partly aromatic tetracarboxylic acids or mixtures of these tetraesters with the corespending tri-, di- or monoesters.

Particularly suitable tetracarboxylic esters are those which are derived from aromatic or partly aromatic tetracarboxylic dianhydrides having at least one aromatic ring. These may be tetracarboxylic esters having an aromatic ring, fused aromatic ring systems or aromatic rings which are bonded by, for example, a single bond, an ether, carbonyl or sulfonyl group or aliphatic hydrocarbon radicals, in particular of 1 to 8 carbon atoms, and, if required, also heteroatoms, such as oxygen, sulfur or nitrogen. The aromatic rings or ring systems may be substituted by, in particular, $C_1$–$C_6$-alkyl or $C_1$–$C_6$-alkoxy groups or halogen atoms, such as chlorine and fluorine.

Examples are the following tetracarboxylic dianhydrides, from which the tetracarboxylic esters are derived: 2,3,9,10-Perylenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, Phenanthrene-1,8,9,10-tetracarboxylic dianhydride, pyromellitic dianhydride, 3,3',4,4'-biphenyltetracarboxylic dianhydride, 2,2',3,3'-biphenyltetracarboxylic dianhydride, 4,4'-isopropylidenediphthalic dianhydride, hexafluoroisopropylidene-2,2-bisphthalic anhydride, 3,3'-isopropylidenediphthalic dianhydride, 4,4'-oxydiphthalic dianhydride, 4,4'-sulfonyldiphthalic dianhydride, 3,3'-oxydiphthalic dianhydride, 4,4'-methylenediphthalic dianhydride, 4,4'-thiodiphthalic dianhydride, 4,4'-acetylidenediphthalic dianhydride, 2,3,6,7'-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, thiophene-2,3,4,5-tetracarboxylic dianhydride, 1-(3',4'-dicarboxyphenyl)-1,3,3-trimethylindane-5,6-dicarboxylic dianhydride, 1-(3',4'-dicarboxyphenyl)-1,3,3-trimethylindane-6,7-dicarboxylic dianhydride, 1-(3',4'-dicarboxyphenyl)-3-methylindane-5,6-dicarboxylic dianhydride, 1-(3',4'-dicarboxyphenyl)-3-methylindane-6,7-dicarboxylic dianhydride, 3,3',4,4'-benzophenonetetracarboxylic dianhydride, 4,5,3',4'-benzophenonetetracarboxylic dianhydride and 2,2'-bis[4-(3,4-dicarboxyphenoxy)phenyl]propane dianhydride.

Mixtures of tetracarboxylic esters are also particularly suitable. Mixtures of tetracarboxylic esters which are derived from oxydiphthalic dianhydrides, benzophenonetetracarboxylic dianhydrides, biphenyltetracarboxylic dianhydrides or hexafluoroisopropylidene-2,2-bisphthalic dianhydride have proven particularly advantageous.

The ester groups of the tetracarboxylic esters are derived, for example, from $C_1$–$C_{20}$-alkanols, such as methanol, ethanol, propanol, isopropanol, butanol or isobutanol, as well as from the corresponding higher homologs. Cycloalkyl esters are also suitable, preferably cyclohexyl and methylcyclohexyl esters. Suitable alcohol components are also aromatic alcohols, such as phenol, cumol or cresol, or partly aromatic alcohols, for example benzyl alcohol, 1-hydroxy-2-phenylethane, 1-hydroxy-3-phenylethane or alkoxyphenyl alcohols, such as phenoxyethyl, phenoxypropyl or phenoxybutyl alcohol, as well as monophenoxyethylene glycol or monophenoxypropylene glycol.

Other suitable alcohol components are N-hydroxyalkylpyrrolidones, for example N-hydroxyethylpyrrolidone or N-hydroxypropylpyrrolidone, or N-hydroxycycloalkylpyrrolidones, eg. N-hydroxycyclohexylpyrrolidone, and the isomers of these substances.

Furthermore, polyfunctional alcohols may also be used in minor amounts.

The preparation of the tetraesters is carried out by esterification of the tetracarboxylic dianhydrides with the above-mentioned alcohols by conventional methods. The alcohol component is usually used in a 5- to 20-fold excess. The esterification is preferably effected at from 80° to 200° C. Complete esterification can be achieved at these temperatures. The reaction times are from 1 to 6 hours. If necessary, esterification catalysts, eg. dimethylaminopyridine or p-toluenesulfonic acid, may also be added.

A number of the stated esters are commercially available.

In addition to tetraesters which contain only one alcohol component, mixed esters which can be obtained by transesterification may also be used. For example, in particular tetraesters of lower alkanols can be transesterified with higher-boiling alcohols, for example tetramethyl or tetraethyl esters with phenoxyalkyl alcohols. The degree of transesterification is not critical.

Other suitable components B are mixtures of tetraesters with diesters, and both symmetrical and asymmetrical diesters may be used. The diesters are generally obtained at relatively low transesterification temperatures of from 50° to 80° C.

In the preparation of the diesters which is known to the skilled worker, small amounts of tri- or tetraesters may be formed. Monoesters are formed only in minor amounts.

If the corresponding crude esters are used instead of purified esters, said crude esters may contain the corresponding higher or lower esters, as is known to the skilled worker.

Mixtures of tetra- and diesters may contain up to 80 mol % of diesters, mixtures of from 40 to 60 mol % of tetraesters and from 40 to 60 mol % of diesters being preferred. The alcohol component of the tetraesters or diesters may be identical or different.

The novel solutions preferably contain tetraesters or mixtures of tetraesters and diesters.

Examples of suitable solvents for the tetracarboxylic esters and diamines are polar organic solvents, such as aliphatic or aromatic alcohols, ethers, ketones, aldehydes or esters.

Highly polar solvents, such as N-methylpyrrolidone, formamide, dimethylformamide, alkylalkylenediureas, such as dimethylethylenediurea or dimethylpropylenediurea, dimethyl sulfoxide, butyrolactone, pyrrolidone, dialkylacetamide, glycols, glycol esters and glycol ethers are preferably used.

The alcohol usually used in excess in the preparation of the tetracarboxylic esters is also obviously preferable as a solvent.

The choice of the solvent or the solvent mixture depends essentially only on the solubility or the polarity of the tetracarboxylic esters and diamines.

If necessary, nonpolar solvents, such as aliphatic or aromatic hydrocarbons, may also be present in solvent mixtures.

The novel solutions contain the tetracarboxylic ester and the diamine preferably in a molar ratio of from 1.5:1 to 1:1.5, particularly preferably about 1:1.

The solids content of the solutions is preferably from 30 to 60% by weight.

For the preparation of the solutions, tetracarboxylic ester, diamine and solvent may be combined in any order. For example, it is possible first to prepare the tetracarboxylic ester by reacting a tetracarboxylic dianhydride with an excess of alcohol and to add the diamine and, if required, further solvent to the mixture obtained. If necessary, stirring is carried out at room temperature or elevated temperatures, for example at from 30° to 120° C., in particular from 40° to 80° C. to bring all components into solution.

The novel solutions may contain conventional additives, such as catalysts for imide formation, dyes, pigments, fillers, leveling agents and viscosity regulators.

They are suitable as coating materials for the production of coatings on a very wide range of substrates, for example metal, glass or silicon. The curing of the coating is preferably effected at final temperatures of from 150° to 450° C., particularly preferably from 300° to 400° C. It has proven particularly advantageous to carry out the curing process in several stages by gradually increasing the temperature to the final temperature.

The novel solutions can also be used to produce thick, bubble-free planar coatings.

| NMP | N-Methylpyrrolidone |
| MPG | Ethyleneglycol monophenyl ether |
| DMAP | Dimethylaminopyridine |
| PTS | p-Toluenesulfonic acid |
| BPDA | Biphenyltetracarboxylic dianhydride |
| BTS-TM | Tetramethyl benzophenonetetracarboxylate |
| PMS | Pyromellitic acid |
| PMS-TM | Tetramethyl pyromellitate |
| BAPP | 2,2-bis[4-(4-aminophenoxy)phenyl]propane |

EXAMPLE 1

Stir a mixture of 114.10 g of NMP, 44.13 g of BPDA (0.15 mol), 0.50 g of DMAP and 69.10 g of MPG (0.50 mol) for 30 min at 120° C., cool to 60° C. and add 62.14 g of BTS-TM (0.15 mol) and, with vigorous stirring, 123.15 g of BAPP (0.30 mol), continue stirring for 60 min at 60° C. and cool.

An excess of MPG is used in order to ensure that essentially all anhydride groups are converted.

EXAMPLE 2

Initially take 100.00 g of NMP and 80.00 g of MPG, dissolve 0.50 g of DMAP therein while stirring, add 93.08 g of PMS-TM (0.30 mol) with thorough stirring at 60° C. and 123.15 g of BAPP (0.30 mol), continue stirring for 60 min at 60° C. and cool.

EXAMPLE 3

Initially take 250.00 g of NMP and 280.00 g of MPG, dissolve 93.08 g of PMS-TM (0.30 mol) therein while stirring and, after the addition of 0.50 g of PTS, heat to 130° C. and keep at this temperature for 1 hour and then distill off 338.00 g of distillate under reduced pressure from a water pump at from 110° to 125° C. into a receiver cooled to a low temperature, cool to 60° C., add 123.15 g of BAPP (0.30 mol) with thorough stirring at 60° C., continue stirring for 60 min at 60° C. and cool.

According to GC analysis, the distillate contains 11.7 g of methanol; thus, a mixture of methyl and MPG esters of pyromellitic acid has formed by transesterification.

EXAMPLE 4 (COMPARATIVE EXAMPLE)

Initially take 100.00 g of NMP, suspend 65.45 g of PMDA (0.30 mol) therein while stirring, add 0.50 g of DMAP and 128.00 g of methanol (10 mol), stir for 60 min at 70° C. add 123.15 g of BAPP (0.30 mol), continue stirring for 60 min at 60° C. and cool.

An excess of methanol is used in order to ensure that essentially all anhydride groups are converted.

| | B1 | B2 | B3 | B4 (Comparison |
|---|---|---|---|---|
| Appearance | clear | clear | clear | clear |
| Color | brown | brown | brown | brown |
| Shelf life (1) | o.k. | o.k. | o.k. | o.k. |
| Imide residue (2) | 50.2% | 45.3% | 44.1% | 42.8% |
| Viscosity [mPa · s/25° C.] | 4650 | 3450 | 5100 | 2250 |
| Max. film thickness (3) | 43 μm | 38 μm | 82 μm | 4 μm |
| Mandrel bending test (4) | passed | passed | passed | crumbles |

(1) After 50 days at room temperature, o.k. means unchanged in appearance, viscosity and film formation
(2) Sample weight of 2 g on a sheet metal cover having a diameter of 120 mm, residue after 2 hours at 300° C. under air
(3) The solutions are applied with a knife coater having a wedge-shaped nip onto metal sheets, heating is carried out to 300° C. at a rate of 10° C./min and this temperature is then maintained for one hour. After cooling, the maximum layer thickness up to which smooth, bubble-free films are obtained is measured.
(4) The metal sheets from (3) coated with a wedge-shaped nip are bent in a mandrel tester over a test mandrel having a diameter of 1 mm.

Examples B1, B2 and B3 show the advance of the novel solutions which contain more highly esterified tetracarboxylic acids in comparison with B4, which contains pure diesters. The advance is in particular in the film-forming capacity, even in thick layers.

We claim:

1. A solution of a polyimide-forming composition, consisting essentially of
    A) an aromatic or partly aromatic diamine and
    B) a tetraester of an imide-forming aromatic or partly aromatic tetracarboxylic acid or a mixture of this tetraester with the corresponding tri-, di- or monoester.

2. An article coated with a polyimide and obtained using a solution as defined in claim 1 as a coating material.

3. A process for the production of coatings on metal, glass or silicon substrates which consists essentially of: applying to the substrate a solution of the polyimide-forming composition defined in claim 1, and thereafter heating the coated substrate to cure the coating.

4. The solution of claim 1, wherein the solid content of the solution is from about 30 to about 60% by weight.

* * * * *